United States Patent
Watarai et al.

(10) Patent No.: US 9,561,734 B2
(45) Date of Patent: Feb. 7, 2017

(54) BICYCLE POWER SUPPLY SYSTEM

(75) Inventors: Etsuyoshi Watarai, Osaka (JP); Taihei Nishihara, Osaka (JP)

(73) Assignee: Shimano Inc., Osaka (JP)

( * ) Notice: Subject to any disclaimer, the term of this patent is extended or adjusted under 35 U.S.C. 154(b) by 1142 days.

(21) Appl. No.: 13/562,670

(22) Filed: Jul. 31, 2012

(65) Prior Publication Data

US 2014/0035356 A1 Feb. 6, 2014

(51) Int. Cl.
| | |
|---|---|
| *B60L 1/00* | (2006.01) |
| *B60L 3/00* | (2006.01) |
| *H02G 3/00* | (2006.01) |
| *B60L 11/18* | (2006.01) |
| *B60L 1/14* | (2006.01) |
| *B60L 7/12* | (2006.01) |
| *B60L 8/00* | (2006.01) |
| *B60L 11/00* | (2006.01) |
| *B62J 99/00* | (2009.01) |

(52) U.S. Cl.
CPC .............. *B60L 11/1877* (2013.01); *B60L 1/14* (2013.01); *B60L 7/12* (2013.01); *B60L 8/003* (2013.01); *B60L 11/005* (2013.01); *B60L 11/007* (2013.01); *B60L 11/1805* (2013.01); *B60L 11/1862* (2013.01); *B60L 2200/12* (2013.01); *B60L 2220/44* (2013.01); *B62J 2099/0013* (2013.01); *Y02T 10/705* (2013.01); *Y02T 10/7005* (2013.01); *Y02T 10/7011* (2013.01); *Y02T 10/7022* (2013.01); *Y02T 10/7044* (2013.01); *Y02T 10/7083* (2013.01)

(58) Field of Classification Search
USPC ........................................................ 307/9.1
See application file for complete search history.

(56) References Cited

U.S. PATENT DOCUMENTS

| 7,015,598 B2 | 3/2006 | Oohara |
| 7,116,008 B2 | 10/2006 | Kitamura et al. |

(Continued)

FOREIGN PATENT DOCUMENTS

| CN | 102025001 A | 4/2011 |
| DE | 10 2005 029 081 A1 | 1/2007 |

(Continued)

OTHER PUBLICATIONS

U.S. Appl. No. 13/316,105, filed Dec. 9, 2011, Kitamura et al.

*Primary Examiner* — Rexford Barnie
*Assistant Examiner* — Xuan Ly
(74) *Attorney, Agent, or Firm* — Global IP Counselors, LLP (57) ABSTRACT

A bicycle power supply system comprises a first power supply, a second power supply, and a power supply level sensing structure. The power supply level sensing structure is operatively coupled to the first and second power supplies. The first and second power supplies are selectively electrically coupled with electrical power being supplied from the second power supply to the first power supply while a first power supply level is detected by the power supply level sensing structure to be below a first prescribed power threshold, and with electrical power being supplied from the first power supply to the second power supply while a second power supply level is detected by the power supply level sensing structure to be below a second prescribed power threshold.

17 Claims, 8 Drawing Sheets

(56) References Cited

U.S. PATENT DOCUMENTS

| | | | |
|---|---|---|---|
| 2007/0040449 A1* | 2/2007 | Spurlin | A61M 5/1723 307/64 |
| 2011/0304200 A1 | 12/2011 | Saida et al. | |
| 2012/0019193 A1* | 1/2012 | Yu | G06F 1/266 320/103 |
| 2012/0136534 A1* | 5/2012 | Walsh | B60L 8/00 701/36 |
| 2012/0168242 A1 | 7/2012 | Kulatunga | |

FOREIGN PATENT DOCUMENTS

| | | |
|---|---|---|
| DE | 603 20 073 T2 | 6/2009 |
| DE | 10 2008 010 097 A1 | 8/2009 |
| JP | 2004-359032 A | 12/2004 |
| JP | 2004359032 * | 12/2004 |
| JP | 2004359032 A * | 12/2004 |

\* cited by examiner

| UNIT NAME | LOW LEVEL DETERMINATION | | POSSIBLE TO CHARGE THE OTHER BATTERY | |
|---|---|---|---|---|
| | POWER LEVEL | PRIORITY | POWER LEVEL | PRIORITY |
| CYCLE COMPUTER | <20% | ④ | 40%< | ① |
| FRONT LAMP | <20% | ③ | 50%< | ② |
| FD | <40% | ② | 80%< | ③ |
| RD | <50% | ① | 90%< | ④ |

BICYCLE POWER SUPPLY SYSTEM

BACKGROUND

Field of the Invention

This invention generally relates to a bicycle power supply system. More specifically, the present invention relates to a bicycle power supply system that can automatically use different power supplies to supply power to bicycle components as appropriate.

Background Information

In recent years, some bicycles are provided with electrically operable and adjustable components. Examples of some these components include lights, suspensions, derailleurs and a seatpost. Often these components are provided with an electric unit that includes such parts as a motor or other drive device for adjusting the component and a position sensor for detecting a position of the component. Typically, bicycles equipped with electrically adjustable and operable components are also provided with a main electrical power supply, such as a battery or a generator. The main electrical power supply can supply electrical energy to any or all of the components. Also, each component can include a secondary electrical power supply that can be used to power a particular component.

However, if the main electrical power supply or the secondary power supplies used to power these devices become depleted, the devices may become inoperable.

SUMMARY

In view of the above, it will be apparent to those skilled in the art from this disclosure that there exists a need for an improved bicycle power supply system. This invention addresses this need in the art as well as other needs, which will become apparent to those skilled in the art from this disclosure.

In view of the state of the known technology, a bicycle power supply system is provided that comprises a first power supply, a second power supply, and a power supply level sensing structure. The power supply level sensing structure is operatively coupled to the first and second power supplies. The first and second power supplies are selectively electrically coupled with electrical power being supplied from the second power supply to the first power supply while a first power supply level is detected by the power supply level sensing structure to be below a first prescribed power threshold, and with electrical power being supplied from the first power supply to the second power supply while a second power supply level is detected by the power supply level sensing structure to be below a second prescribed power threshold.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
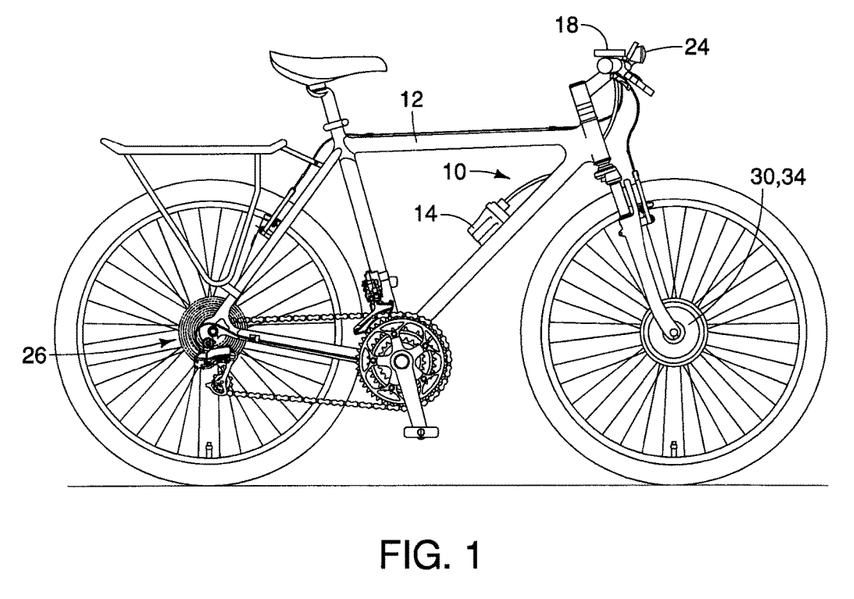
FIG. 1 is a side elevational view of a bicycle that is equipped with a bicycle power supply system in accordance with disclosed embodiments.
Figure 2:
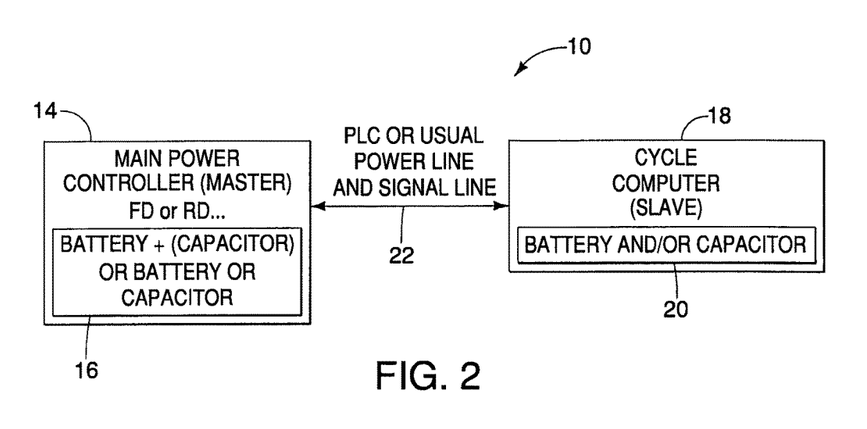
FIG. 2 is a schematic block diagram showing an exemplary configuration of the bicycle power supply system according to a disclosed embodiment.

FIGS. 1 and 2 illustrate a bicycle power supply system 10 for a bicycle 12 according to a disclosed embodiment. The bicycle power supply system 10 includes a first controller 14, such as a microcomputer, which can operate as a main or master controller as discussed herein. The first controller 14 can include or be electrically coupled to a first or main power supply 16. The first power supply 16 can include, for example, a battery. The battery can be a rechargeable battery, for example, a nickel hydrogen battery or a lithium ion battery, or any other suitable type of battery. However, the first power supply 16 is not limited to including a battery. Rather, the first power supply 16 can include a capacitor, or a battery and capacitor arrangement as understood in the art. Any configuration of the first power supply 16 can also be charged by a charging unit, such as a generator (not shown) that can be coupled to the front and/or rear wheel of the bicycle 12, or in any other suitable manner. Alternatively, the first power supply 16 can be configured as a generator by itself as understood in the art.

The bicycle power supply system 10 further includes a slave or second controller 18, such as a microcomputer. In this example, the second controller 18 can be configured as part of a cycle computer that is mounted on a handlebar of the bicycle 12 or at any other suitable location. The second controller 18 can include or be electrically coupled to a second power supply 20. The second power supply 20 can include, for example, a battery. The battery can be a rechargeable battery, for example, a nickel hydrogen battery or a lithium ion battery, or any other suitable type of battery. However, the second power supply 20 is not limited to including a battery. Rather, the second power supply 20 can include a capacitor, or a battery and capacitor arrangement as understood in the art. Any configuration of the second power supply 20 can also be charged by a charging unit, such as a generator (not shown) that can be coupled to the front and/or rear wheel of the bicycle 12, or in any other suitable manner. Alternatively, the second power supply 20 can be configured as a generator by itself as understood in the art.

The first controller 14 and the second controller 18 in this example can be coupled together via an electric power line communication (PLC) section 22 that is configured to execute communication by PLC (power line communications). That is, the first controller 14 and the second controller 18 can execute two-way communications with each other via PLC section 22. Optionally, instead of using power line communications (PLC), in addition to a ground wire GND and a voltage wire V, separate signal wires POS (for Position signal of a transmission), FSS (for Front shift signal) and RSS (for Rear shift signal) can be provided for transmitting data as needed and/or desired between the first controller 14 and the second controller 18.

The second controller 18 can control electrically operable or adjustable components of the bicycle 12. For example, the bicycle 12 can be equipped with at least one light assembly 24, such as a front lamp and/or a rear lamp that can be controlled by the cycle computer (e.g., the second controller 18) and powered by the first power supply 16 or the second power supply 20 as understood in the art. The cycle computer (e.g., the second controller 18) can also control or configure other components such as electrically operable front and rear derailleurs 26, an electrically adjustable seat post (not shown) and electrically adjustable front and rear suspensions (not shown). Other than the bicycle power supply system 10 as discussed herein, the bicycle 12 can have any type of suitable bicycle components. Thus, the parts of the bicycle 12 will not be discussed herein, except for those parts that will assist in the understanding of the bicycle power supply system 10.

The first controller 14 and the second controller 18 each includes a central processing unit (CPU) and other conventional components such as an input interface circuit, an output interface circuit, and storage devices such as a ROM (Read Only Memory) device and a RAM (Random Access Memory) device. The first controller 14 and the second controller 18 can be provided with various control programs that control the components of the bicycle 12 as discussed herein. For example, the first controller 14 and the second controller 18 each can include manual control programs for manually controlling these components, as well as automatic control programs for automatically controlling these components. It will be apparent to those skilled in the art from this disclosure that the precise structure and algorithms for the first controller 14 and the second controller 18 can be any combination of hardware and software that will carry out the functions of the present invention.

An example of the operations of the bicycle power supply system 10 according to the embodiment shown in FIGS. 1 and 2 will now be described with regard to the processing diagram of FIG. 3 and the flowchart of FIG. 4. For exemplary purposes, the first controller 14 is described as performing much of the processing shown in FIG. 4. However, the processing can instead be performed by the second controller 18, or some or all of the processing can be performed by the first controller 14 and the second controller 18 independently or in cooperation with each other. Also, the process will initially be described with regard to the power supply level of the second power supply 20. However, as discussed below, the process shown in FIG. 4 can be used to monitor the respective power level of the first power supply 16 and the second power supply 20, and can use the other power supply to charge the power supply whose power level is below the predetermined level.

When the processing begins in step S1, a determination can be made in step S2 as to whether the battery power of the second power supply 20 is less than a first predetermined level. That is, the first controller 14, the second controller 18, or both, can be configured to operate as a power supply level sensing structure operatively coupled to the first power supply 16 and the second power supply 20. For example, the first controller 14 can operate as a first power supply sensor that is operatively coupled to the first power supply 16 to detect the first power supply level of the first power supply. In other words, the first power supply sensor and the first controller 14 can be arranged as an integrated unit. Likewise, the second controller 18 can operate as a second power supply sensor operatively coupled to the second power supply 20 to detect the second power supply level of the second power supply 20. Thus, the second power supply sensor can be an integrated unit of the second controller 18. Furthermore, the second controller 18 can provide a power level signal representing the second power supply level to the first controller 14, and vice-versa. However, the power supply level sensing structure could also be configured separately from the first controller 14 and the second controller 18.

While the power supply level sensing structure senses that the battery power of the second power supply 20 is at or above the first predetermined level, the processing continues to step S3. In step S3, the second controller 18 is powered by the second power supply 20. For example, the first controller 14, the second controller 18, or both, can operate to selectively electrically uncouple the first power supply 16 from the second power supply 20. Thus, the cycle computer of the second controller 18 can be powered by the second power supply 20.

However, when the power level sensing structure senses in step S2 that the battery power of the second power supply 20 is less than the first predetermined level, the processing continues to step S4. As shown in FIG. 3, the second controller 18 can send a signal to the first controller 14 via the PLC section 22 or in any suitable manner to indicate to the first controller 14 that the power level of the second power supply 20 is less than the first predetermined level. Alternatively, as discussed above, the first controller 14 can also operate as a power level sensing structure to sense that the battery power of the second power supply 20 is less than the first predetermined level. In any event, a determination is made in step S4 whether the power level of the first power supply 16 is higher than a prescribed power level that is, for example, sufficient to charge the second power supply 20.

For instance, the first controller 14 can determine whether the power level of the first power supply 16 is higher than the prescribed power level. If the power level of the first power supply 16 is not higher than the prescribed power level, the processing can end in step S5. However, if the power level of the first power supply 16 is higher than the prescribed power level, the processing can continue to step S6. In step S6, and as shown in FIG. 3, the first controller 14, the second controller 18, or both, can selectively electrically couple the first power supply 16 to the second power supply 20 via, for example, the PLC section 22 or in any suitable manner to supply electrical power from the first power supply 16 to the second power supply 20. Therefore, the electrical power being supplied by the first power supply 16 can charge the second power supply 20 in step S6. Thus, in this example, the first controller 14 only electrically couples the first power supply 16 to the second power supply 20 upon determining that a current power level of the first power supply 16 is above a prescribed power level.

The processing then continues to step S7 where the power level sensing structure senses whether the second power supply 20 is sufficiently charged. If the second power supply 20 is not sufficiently charged, for example, the power level of the second power supply 20 is not at or above a second predetermined level, the first power supply 16 continues to charge the second power supply 20. The second predetermined level is higher than the first predetermined level in step S2. That is, if the second predetermined level and the first predetermined level are same, the charging may occur continuously. Thus, this can be avoided by setting the second predetermined level to be at least slightly higher than the first predetermined level. Thus, as shown in FIG. 3, the first controller 14, the second controller 18, or both, will continue to electrically couple the first power supply 16 to the second power supply 20 to supply electrical power from the first power supply 16 to the second power supply 20.

However, when the power level sensing structure senses that the second power supply 20 is sufficiently charged, the processing proceeds to step S8. As discussed above, the second controller 18 can send a notification to the first controller 14 concerning the power level of the second power supply 20, or the first controller 14 can directly sense the power level of the second power supply 20. In any event, the first controller 14, the second controller 18, or both, will electrically uncouple the first power supply 16 from the second power supply 20 to discontinue supplying electrical power from the first power supply 16 to the second power supply 20 upon determining that the second power supply 20 reaches a prescribed charge threshold.

Figure 3:
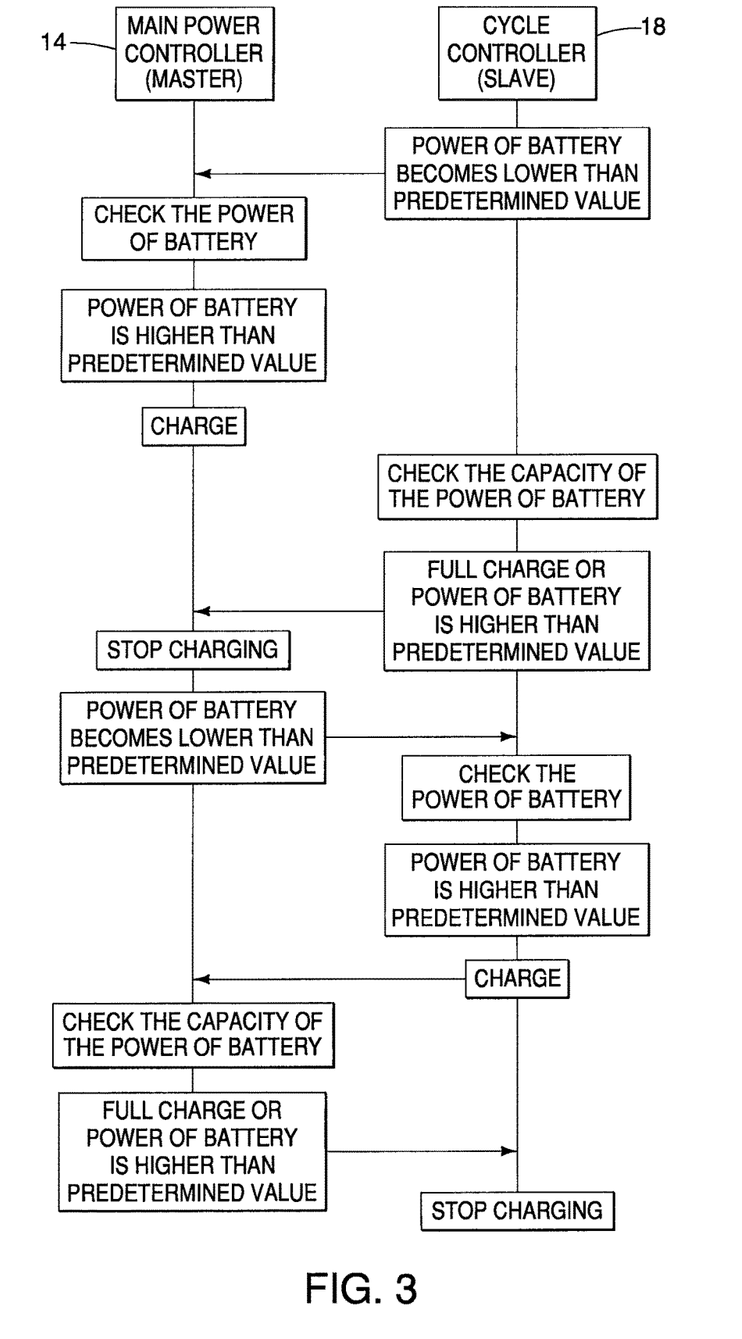
FIG. 3 is a processing diagram illustrating exemplary operations performed by the bicycle power supply system shown in FIG. 2.
Figure 4:
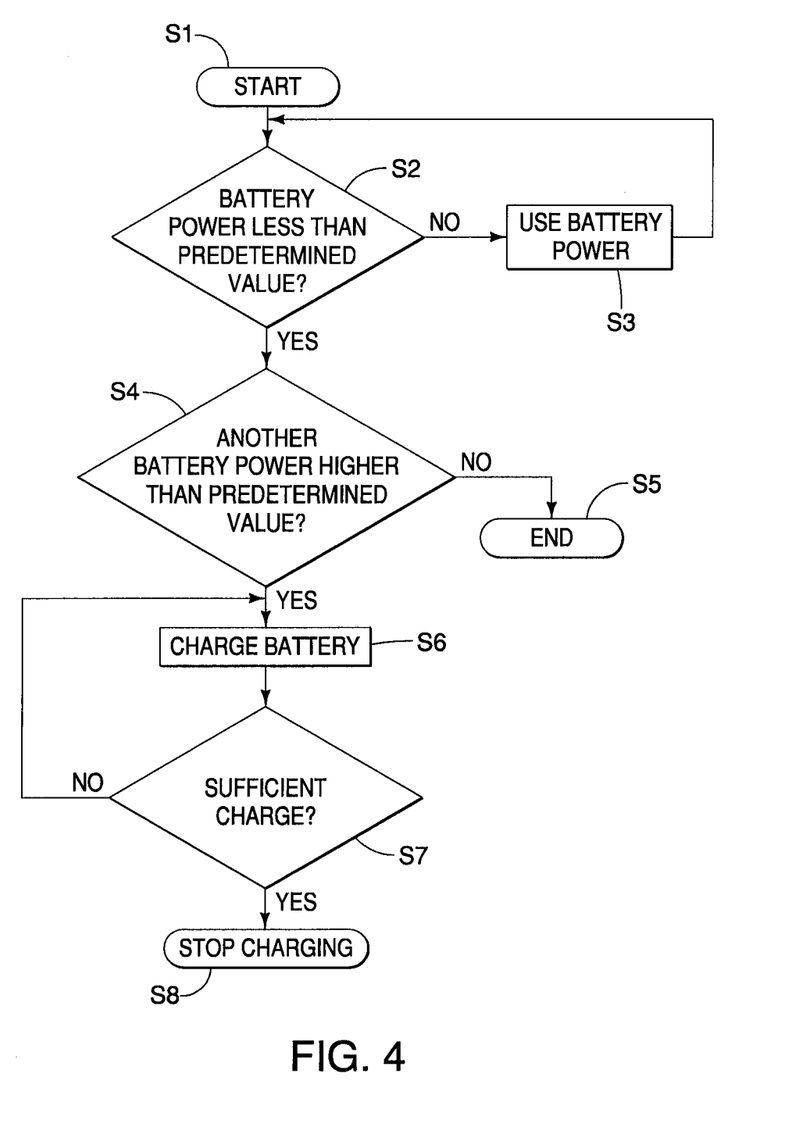
FIG. 4 is a flowchart illustrating exemplary operations performed by the bicycle power supply system shown in FIG. 2.

As further shown in FIG. 3, the process shown in FIG. 4 can be performed with regard to the first power supply 16. That is, when the processing begins in step S1, a determination can be made in step S2 as to whether the battery power of the first power supply 14 is less than a third predetermined level. As discussed above, the first controller 14, the second controller 18, or both, can be configured to operate as the power supply level sensing structure operatively coupled to the first power supply 16 and the second power supply 20, or a power supply level sensing structure separate from the first controller 14 and the second controller 18 could be used.

While the power level sensing structure senses that the battery power of the first power supply 16 is at or above the third predetermined level, the processing continues to step S3. In step S3, the first controller 14 is powered by the first power supply 16. For example, the first controller 14, the second controller 18, or both, can operate to selectively electrically uncouple the first power supply 16 from the second power supply 20. Thus, the first controller 14 can be powered by the first power supply 16.

However, when the power level sensing structure senses in step S2 that the battery power of the first power supply 16 is less than the third predetermined value, the processing continues to step S4. As shown in FIG. 3, the first controller 14 can send a signal to the second controller 18 via the PLC section 22 or in any suitable manner to indicate to the second controller 18 that the power level of the first power supply 16 is less than the third predetermined level. As discussed above, the second controller 18 can also operate as a power level sensing structure to sense that the battery power of the first power supply 16 is less than the third predetermined level. In any event, a determination is made in step S4 whether the power level of the second power supply 20 is higher than a prescribed level that is, for example, sufficient to charge the first power supply 16.

For instance, the second controller 18 can determine whether the power level of the second power supply 20 is higher than the prescribed power level. If the power level of the second power supply 20 is not higher than the prescribed level, the processing can end in step S5. However, if the power level of the second power supply 20 is higher than the prescribed level, the processing can continue to step S6. In step S6, and as shown in FIG. 3, the first controller 14, the second controller 18, or both, can selectively electrically couple the first power supply 16 to the second power supply 20 via, for example, the PLC section 22 or in any suitable manner to supply electrical power from the second power supply 20 to the first power supply 16. Therefore, the electrical power being supplied by the second power supply 20 can charge the first power supply 16 in step S6.

The processing then continues to step S7 where the power level sensing structure senses whether the first power supply 16 is sufficiently charged. If the first power supply 16 is not sufficiently charged, for example, the power level of the first power supply 20 is not at or above a fourth predetermined value, the second power supply 20 continues to charge the first power supply 16. The fourth predetermined level is higher than the second predetermined level in step S2. That is, if the fourth predetermined level and the third predetermined level are same, the charging may occur continuously. Thus, this can be avoided by setting the fourth predetermined level to be at least slightly higher than the third predetermined level. Thus, as shown in FIG. 3, the first controller 14, the second controller 18, or both, will continue to electrically couple the first power supply 16 to the second power supply 20 to supply electrical power from the second power supply 20 to the first power supply 16.

However, when the power level sensing structure senses that the first power supply 16 is sufficiently charged, the processing proceeds to step S8. As discussed above, the first controller 16 can send a notification to the second controller 18 concerning the power level of the first power supply 16, or the second controller 18 can directly sense the power level of the first power supply 16. In any event, the first controller 14, the second controller 18, or both, will electrically uncouple the first power supply 16 from the second power supply 20 to discontinue supplying electrical power from the second power supply 20 to the first power supply 16.

Thus, as described above, the first and second power supplies 16 and 20 are selectively electrically coupled to each other. Accordingly, electrical power is supplied from the second power supply 20 to the first power supply 16 while the power supply level of the first power supply 16 (e.g., a first power supply level) is detected by the power supply level sensing structure to be below a first prescribed power threshold which corresponds to the third predetermined level discussed above. Likewise, electrical power is supplied from the first power supply 16 to the second power supply 20 while the power supply level of the second power supply 20 (e.g., a second power supply level) is detected by the power supply level sensing structure to be below a second prescribed power threshold which corresponds to the first predetermined level discussed above.

Figure 5:
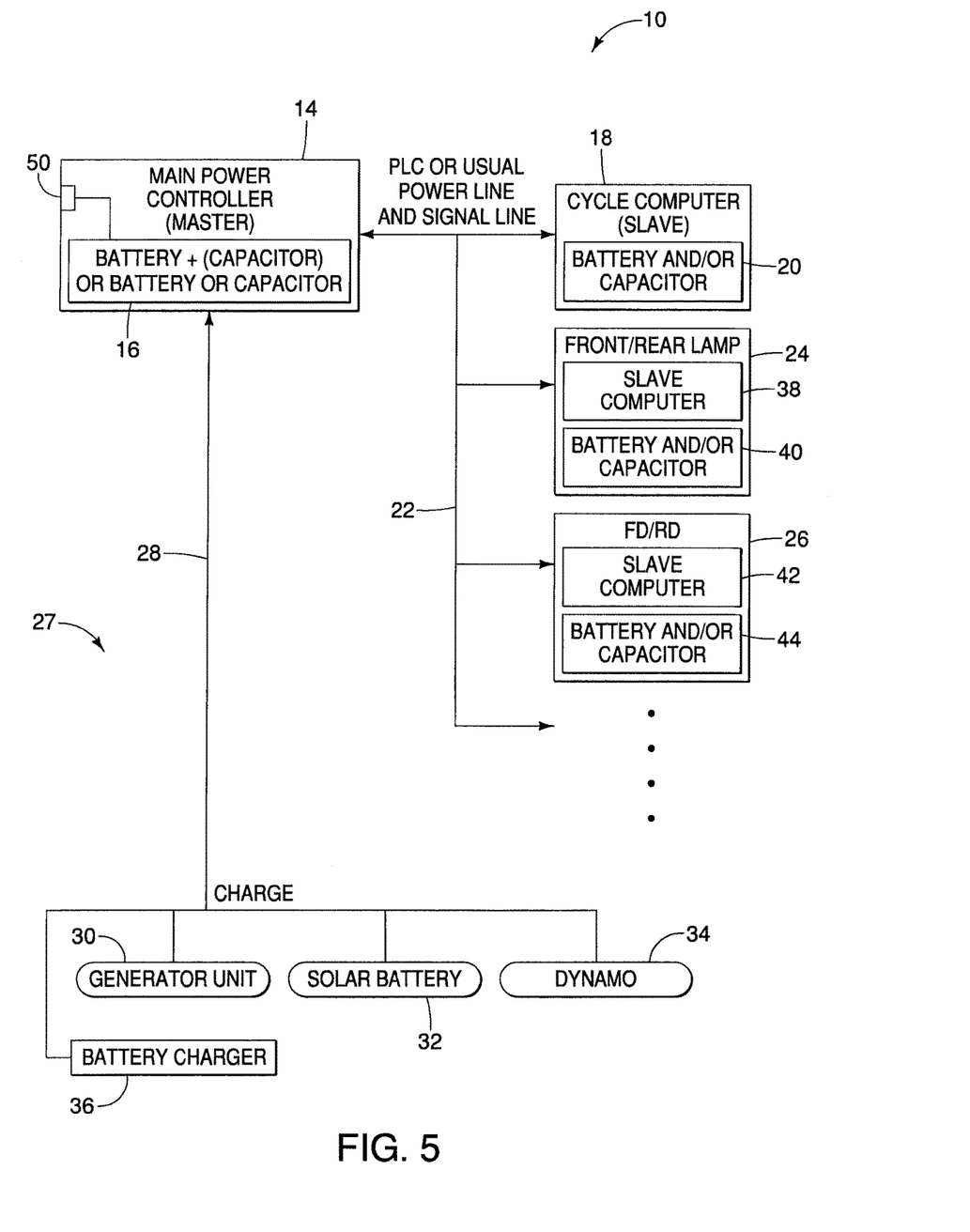
FIG. 5 is a schematic block diagram showing an exemplary configuration of the bicycle power supply system according to another disclosed embodiment.

Another embodiment of the bicycle power supply system 10 is shown in FIG. 5. As indicated, the bicycle power supply system 10 includes all of the components discussed above with regard to FIGS. 1 and 2, and thus the same numerals are used to identify these components. For example, the embodiment shown in FIG. 5 includes the first controller 14, the first power supply 16, the second controller 18, the second power supply 20, and the PLC section 22 as discussed above.

However, this embodiment further includes a charging unit 27 that is configured to charge the first power supply 16, the second power supply 20, or both. In this example, the charging unit 27 includes an electrical cable 28 that is detachably coupled to the first power supply 16. The charging unit 27 can further include a generator unit 30, a solar battery 32, a dynamo 34, and any other suitable type of battery charger 36 as shown. Naturally, the charging unit 27 can include all of these components or any combination of these components that can operate in series or parallel as understood in the art. Thus, the electrical cable 28 electrically couples the generator unit 30, the solar battery 32, the dynamo 34, and the battery charger 36 to the first power supply 16.

Furthermore, in this embodiment, the light assembly 24 can include or be associated with a slave or third controller 38, such as a microcomputer, having features similar to those of the first controller 14 and the second controller 18 as discussed above. The light assembly 24 can also include or be electrically coupled to a third power supply 40. As with the first power supply 16 and the second power supply 20, the third power supply 40 can include, for example, a battery. The battery can be a rechargeable battery, for example, a nickel hydrogen battery or a lithium ion battery, or any other suitable type of battery. However, the third power supply 40 is not limited to including a battery. Rather, the third power supply 40 can include a capacitor, or a battery and capacitor arrangement as understood in the art. Any configuration of the third power supply 40 can also be charged by a charging unit, such as the charging unit 27 which can be coupled to the third power supply 40 via the PLC section 22, the electrical cable 28 or in any other suitable manner. Alternatively, the third power supply 38 can be configured as a generator by itself as understood in the art.

Also in this embodiment, the front and rear derailleurs 26 can each include or be associated with a slave or fourth controller 42, such as a microcomputer, having features similar to those of the first controller 14 and the second controller 18 as discussed above. Naturally, the front and rear derailleurs 26 can both be controlled by a single fourth controller 42. The front and rear derailleurs 26 can each also include or be electrically coupled to a fourth power supply 44. That is, each of the front and rear derailleurs 26 can include or be associated with a respective fourth power supply 44 or with the same fourth power supply 44. As with the first power supply 16, the second power supply 20 and the third power supply 38, the fourth power supply 44 can include, for example, a battery. The battery can be a rechargeable battery, for example, a nickel hydrogen battery or a lithium ion battery, or any other suitable type of battery. However, the fourth power supply 44 is not limited to including a battery. Rather, the fourth power supply 44 can include a capacitor, or a battery and capacitor arrangement as understood in the art. Any configuration of the fourth power supply 44 can also be charged by a charging unit, such as the charging unit 27 which can be coupled to the fourth power supply 44 via the PLC section 22, the electrical cable 28 or in any other suitable manner. Alternatively, the fourth power supply 44 can be configured as a generator by itself as understood in the art.

In addition, the first controller 14 in this embodiment includes an interface port 50 for purposes such as those discussed in more detail below. Also, each of the first controller 14, the second controller 28, the third controller 38 and the fourth controller 42 can include a similar interface port 50. Furthermore, the generator unit 30, the solar battery 32, the dynamo 34, and the battery charger 36 can be electrically coupled to the second power supply 20, the third power supply 40 and the fourth power supply 44 directly and/or via the PLC section 22.

An example of the operations of the bicycle power supply system 10 according to the embodiment shown in FIG. 5 will now be described with regard to the processing diagram of FIG. 6 and the flowchart of FIG. 7. For exemplary purposes, the first controller 14 is described as performing much of the processing shown in FIG. 7. However, the processing can instead be performed by the second controller 18, the third controller 38 or the fourth controller 42, or some or all of the processing can be performed by the first controller 14, the second controller 18, the third controller 38 and the fourth controller 42 independently or in cooperation with each other. Also, the process will initially be described with regard to the power supply level of the second power supply 20. However, as discussed below, the process shown in FIG. 7 can be used to monitor the respective power level of the first power supply 16, the second power supply 20, the third power supply 40 and the fourth power supply 44 and can use any of the other power supplies to charge the power supply whose power level is below the predetermined level.

When the processing begins in step S11, a determination can be made in step S12 as to whether the battery power of the second power supply 20 is less than a first predetermined level. That is, the first controller 14 can be configured to operate as a power supply level sensing structure operatively coupled to the first power supply 16, the second power supply 20, the third power supply 40 and the fourth power supply 44. Alternatively, any combination of the first controller 14, the second controller 18, the third controller 38 and the fourth controller 42 can be configured to operate as a power supply level sensing structure operatively coupled to the first power supply 16, the second power supply 20, the third power supply 40 and the fourth power supply 44.

For example, as discussed above with regard to the embodiment shown in FIGS. 2 through 4, the first controller 14 can operate as a first power supply sensor that is operatively coupled to the first power supply 16 to detect the first power supply level of the first power supply. Also, the first power supply sensor and the first controller 14 can be arranged as an integrated unit. Likewise, the second controller 18 can operate as a second power supply sensor operatively coupled to the second power supply 20 to detect the second power supply level of the second power supply 20. Thus, the second power supply sensor can be an integrated unit of the second controller 18. The power supply level sensing structure further includes a third power supply sensor operatively coupled to the third power supply 40 to detect a third power supply level of the third power supply 40. The third controller 38 can include the third power supply sensor as an integrated unit of the third controller 38. The power supply level sensing structure can further include a fourth power supply sensor operatively coupled to the fourth power supply 44 to detect a fourth power supply level of the fourth power supply 44. The fourth controller 42 can include the fourth power supply sensor as an integrated unit of the fourth controller 42. However, the power supply level sensing structure could also be configured separately from the first controller 14, the second controller 18, the third controller 38 and the fourth controller 42.

While the power level sensing structure senses that the battery power of the second power supply 20 is at or above the first predetermined level, the processing continues to step S13. In step S13, the second controller 18 is powered by the second power supply 20. For example, the first controller 14, the second controller 18, or both, can operate to selectively electrically uncouple the first power supply 16 from the second power supply 20. The first controller 14, or any combination of the first controller 14, the second controller 18, the third controller 38 and the fourth controller 42, can also operate to selectively uncouple the third power supply 40 and the fourth power supply 44 from the second power supply 20. Thus, the cycle computer of the second controller 18 can be powered by the second power supply 20.

However, when the power level sensing structure senses in step S12 that the battery power of the second power supply 20 is less than the first predetermined level, the processing continues to step S14. As shown in FIG. 6, the second controller 18 can send a signal to the first controller 14 via the PLC section 22 or in any suitable manner to indicate to the first controller 14 that the power level of the second power supply 20 is less than the first predetermined level. As discussed above, the first controller 14 can also operate as a power level sensing structure to sense that the battery power of the second power supply 20 is less than the first predetermined level. In any event, the processing can then determine in step S14 whether any of the first power supply 16, the third power supply 40 and the fourth power supply 44 is available to charge the second power supply 20 based on the respective power levels and priorities assigned to these power supplies.

Figure 8:
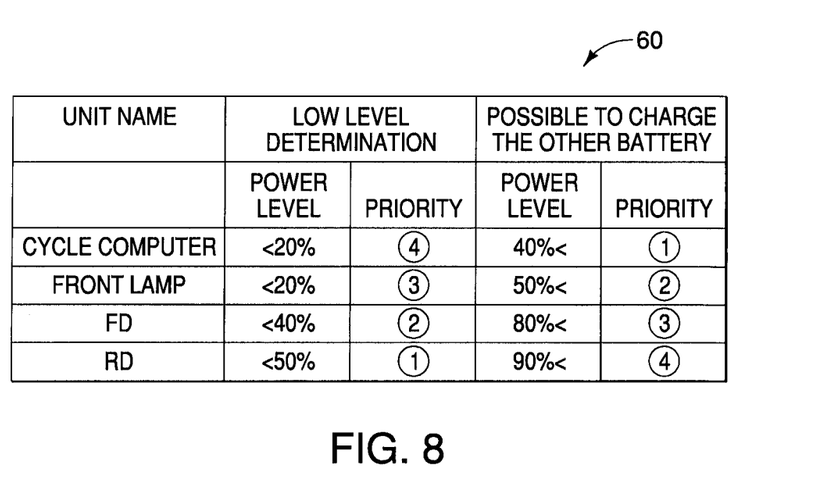
FIG. 8 is a table illustrating an example of low power levels and priorities for the power supplies in the bicycle power supply system shown in FIG. 5.

As shown in the table of FIG. 8, a respective predetermined level can be associated with each of the slave power supplies, such as the second power supply 20, the third power supply 40 and the fourth power supplies 44. For purposes of this example, one fourth power supply 44 is associated with the front derailleur 26 and another fourth power supply 44 is associated with the rear derailleur 26. As shown in this example, the predetermined level of the power supply 20 can be 20% of the total power capacity of the second power supply 20. This indicates that the second power supply 20 can be in need of charging and/or the components operated by the second power supply 20 should be operated by one of the other power supplies, when the power level of the second power supply 18 falls below 20% of the total power capacity. Similarly, the predetermined level of the third power supply 40 can be 20% of the total power capacity of the third power supply 40. The predetermined level of the fourth power supply 44 associated with the front derailleur 26 can be 40% of the total power capacity of that fourth power supply 40. The predetermined level of the fourth power supply 44 associated with the rear derailleur 26 can be 50% of the total power capacity of that fourth power supply 44.

In addition, a respective charged priority level can be associated with each of the slave power supplies as shown in the table of FIG. 8. The charged priority level indicates a level of importance of a particular slave power supply. For example, the charged priority level of the second power supply 20 is priority level 4, meaning that the second power supply 20 that operates the cycle computer 18 can be depleted before any of the other slave power supplies or can be the last of the slave power supplies to be charged. Similarly, the charged priority level of the third power supply 40 is priority level 3, meaning that the third power supply 40 that operates the front lamp 24 can be depleted before any of the slave power supplies 44 that operate the derailleurs 26 or charged after the slave power supplies that operate the derailleurs 26. The charged priority level of the fourth power supply 44 associated with the front derailleur 26 is priority level 2, meaning that the fourth power supply 44 that operates the front derailleur 26 can be depleted before the fourth power supply 44 that operates the rear derailleur 26 or charged after the fourth power supply 44 that operates the rear derailleur 26. The charged priority level of the fourth power supply 44 associated with the rear derailleur 26 is priority level 1, meaning that the fourth power supply 44 that operates the rear derailleur 26 should be the last of the slave power supplies that is depleted and the first slave power supply to be charged.

The table of FIG. 8 further illustrates examples of prescribed power levels associated with the slave power supplies at which the respective slave power supplies are available to charge the main (first) power supply 16 or one of the other slave power supplies 20, 40 and 44. For example, the prescribed power level of the power supply 20 can be 40% of the total power capacity of the second power supply 20. This indicates that the second power supply 20 can be used for charging as long as the power level of the second power supply 20 does not fall below 40% of the total power capacity. Similarly, the prescribed power level of the third power supply 40 can be 50% of the total power capacity of the third power supply 40. The prescribed power level of the fourth power supply 44 associated with the front derailleur 26 can be 80% of the total power capacity of that fourth power supply 40. The prescribed power level of the fourth power supply 44 associated with the rear derailleur 26 can be 90% of the total power capacity of that fourth power supply 44. Thus, the fourth power supply 44 associated with the rear derailleur 26 would not be used to charge any other power supplies unless the power of that fourth power supply 44 is at least 90% of its maximum power capacity.

In addition, a respective charging priority level can be associated with each of the slave power supplies as shown in the table of FIG. 8. The charging priority level is inversely proportional to the charged priority level. For example, the charging priority level of the second power supply 20 is priority level 1, meaning that the second power supply 20 can be used before any of the other slave power supplies to charge another power supply. Similarly, the charging priority level of the third power supply 40 is priority level 2, meaning that the third power supply 40 can be used before any of the slave power supplies 44 that operate the derailleurs 26 to charge another power supply. The charging priority level of the fourth power supply 44 associated with the front derailleur 26 is priority level 3, meaning that the fourth power supply 44 that operates the front derailleur 26 can be used before the fourth power supply 44 that operates the rear derailleur 26 to charge another power supply. The charging priority level of the fourth power supply 44 associated with the rear derailleur 26 is priority level 4, meaning that the fourth power supply 44 that operates the rear derailleur 26 should be the last of the slave power supplies to be used to charge another power supply.

It should also be noted that the priority levels discussed above could be set and adjusted by a priority setting component that can be, for example, an integrated unit of the first controller 14. The priority setting component can include preset priority levels based on, for example, bicycle type, and the preset priority levels can be selected as the respective priority levels. Alternatively, the priority setting component can include the interface port 50 at the first controller 14 or any other controller to receive control signals from a remote device to set the respective priority levels. In addition, the first controller 14 can include a threshold setting component that selectively sets the prescribed power threshold levels as discussed above. Naturally, the threshold setting component can also include the interface port at the first controller 14 or any other controller to receive control signals from a remote device to set the respective power threshold levels.

Figure 9:
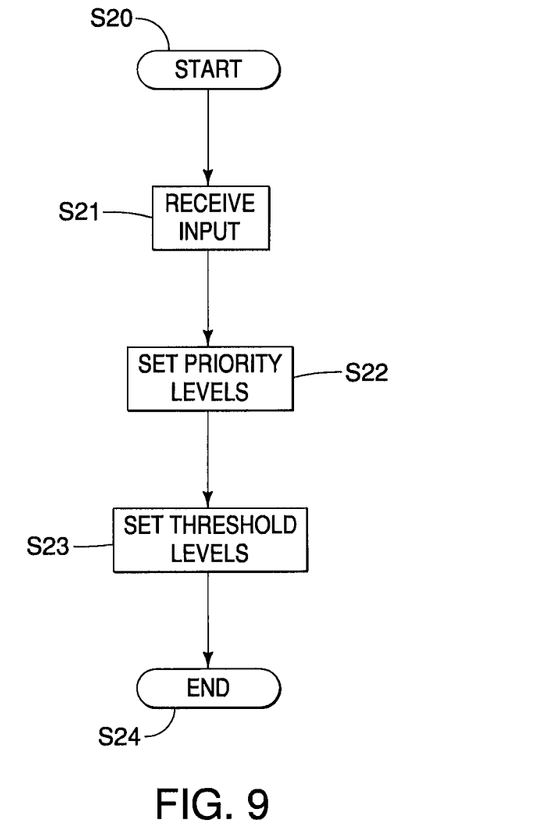
FIG. 9 is a flowchart illustrating exemplary operations performed by the bicycle power supply system shown in FIG. 5 to set the priority levels and the threshold levels shown in the table in FIG. 8.

As shown in the flowchart of FIG. 9, the first controller 14 can operate beginning at step S20 to perform a priority and threshold setting process. For example, the first controller 14 can receive an input in step S21 to set or adjust the priority levels and the thresholds discussed above. Thus, the first controller 14 can set the priority levels in step S22, and can set the threshold levels in step S23. The processing can then stop in step S24 after the priority levels and threshold levels have been set.

Returning now to FIGS. 6 and 7, the processing takes the priority levels and threshold levels shown in the table of FIG. 8 to select one of the slave power supplies in step S14. In this example, the third power supply 40 is selected as the available power supply as shown in the diagram of FIG. 6.

Figure 6:
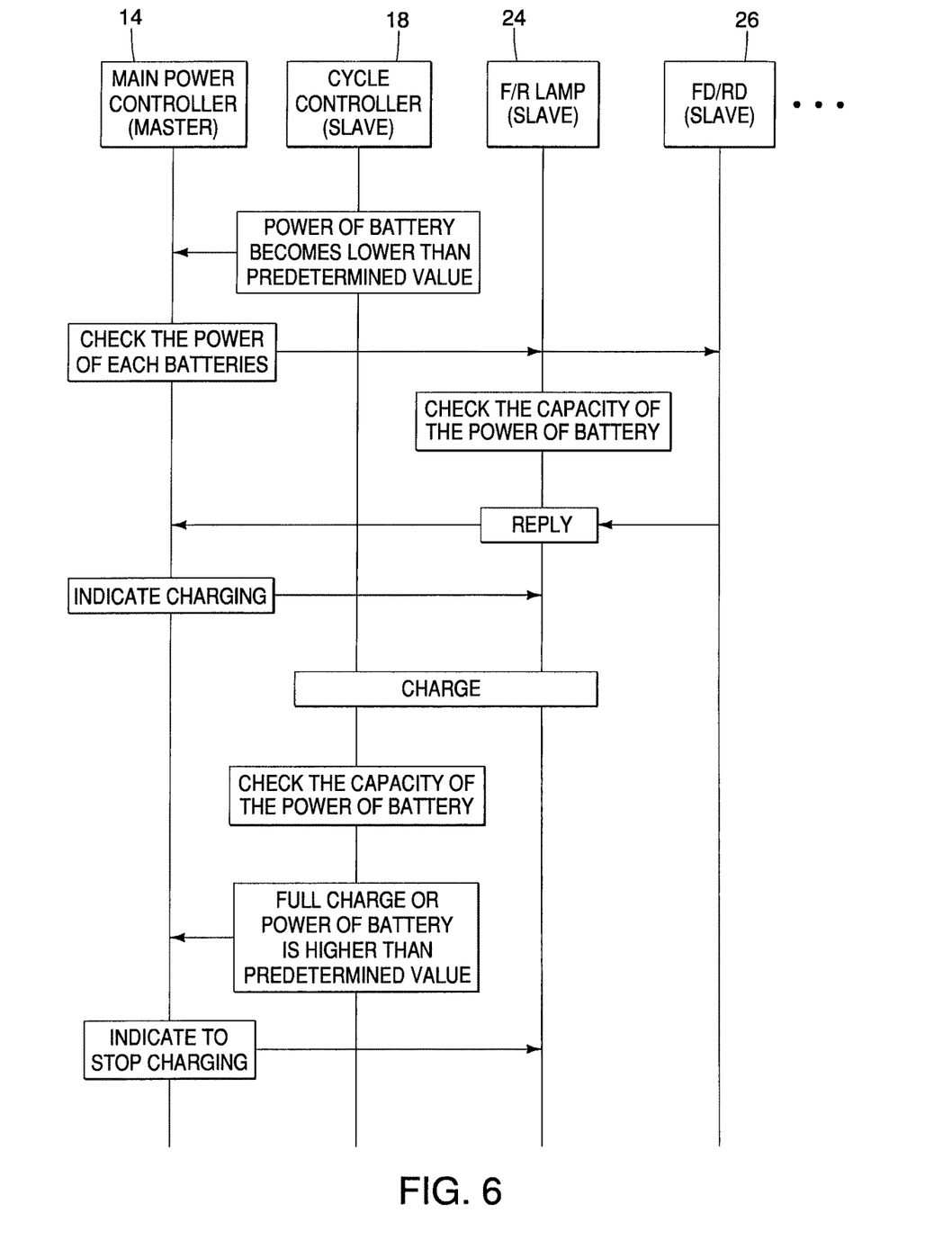
FIG. 6 is a processing diagram illustrating exemplary operations performed by the bicycle power supply system shown in FIG. 5.
Figure 7:
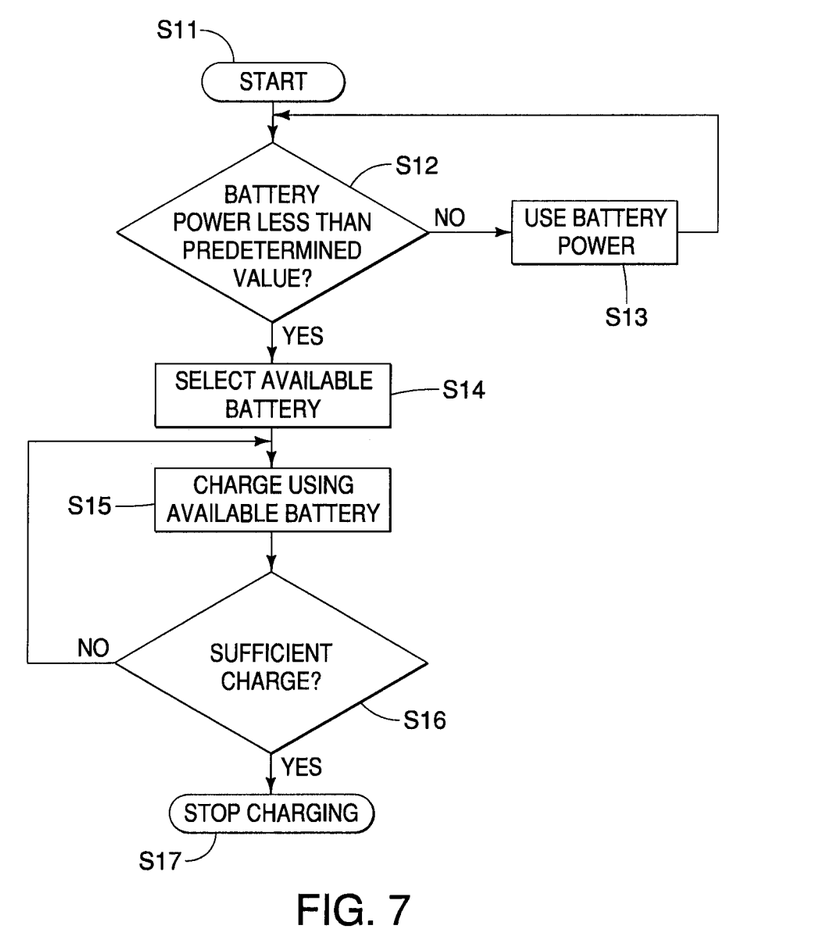
FIG. 7 is a flowchart illustrating exemplary operations performed by the bicycle power supply system shown in FIG. 5.

In step S15, and as shown in FIG. 6, the first controller 14, the second controller 18, the third controller 38, or a combination of these controllers 14, 18 and 38, can selectively electrically couple the third power supply 16 to the second power supply 20 via, for example, the PLC section 22 or in any suitable manner to supply electrical power from the third power supply 40 to the second power supply 20. Therefore, the electrical power being supplied by the third power supply 40 can charge the second power supply 20 in step S15. If there is not an available battery, the first power supply 16 can be selected or the processing can end.

The processing then continues to step S16 where the power level sensing structure senses whether the second power supply 20 is sufficiently charged. If the second power supply 20 is not sufficiently charged, for example, the power level of the second power supply 20 is not at or above a second predetermined level, the third power supply 40 continues to charge the second power supply 20. The second predetermined level is higher than the first predetermined level in step S12. Thus, as shown in FIG. 6, the first controller 14, the second controller 18, the third controller 38, or a combination of these controllers, will continue to electrically couple the third power supply 40 to the second power supply 20 to supply electrical power from the third power supply 40 to the second power supply 20.

However, when the power level sensing structure senses that the second power supply 20 is sufficiently charged, the processing proceeds to step S17. As discussed above, the second controller 18 can send a notification to the first controller 14 concerning the power level of the second power supply 20, or the first controller 14 can directly sense the power level of the second power supply 20. In any event, the first controller 14 can send an indication to the third controller 38 so stop using the third power supply 40 to charge the second power supply 20. Thus, first controller 14, the second controller 18, the third controller 38, or a combination of the controllers 14, 18 and 38, will electrically uncouple the third power supply 40 from the second power supply 20 to discontinue supplying electrical power from the third power supply 40 to the second power supply 20.

The process described above can be performed to use any of the power supplies 16, 20, 40 and 44 discussed above to charge any of the other power supplies 16, 20, 40 and 44 in a similar manner. In the example described above, the power supply 20 can be viewed as a first power supply, and the power supply 40 can be viewed as a second power supply. The first controller 14, for example, could thus select these two power supplies 20 and 40 of at least three power supplies 20, 40 and 44 as the first and second power supplies based on respective power levels and/or priority levels of the power supplies 20, 40 and 44 as discussed above. As in the embodiment discussed above with regard to FIGS. 2 through 4, electrical power is supplied from the second power supply (e.g., power supply 40) to the first power supply (e.g., power supply 20) while a first power supply level is detected by the power supply level sensing structure to be below a first prescribed power threshold, which corresponds to the first predetermined level discussed above with regard to step S12. Similarly, electrical power can be supplied from the first power supply (e.g., power supply 20) to the second power supply (e.g., power supply 40) while a second power supply level is detected by the power supply level sensing structure to be below a second prescribed power threshold which can correspond to a level shown in FIG. 8 associated with the power supply 40.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle power supply system comprising:
a first power supply;

a second power supply;
a power supply level sensing structure operatively coupled to the first and second power supplies; and
a first controller configured to selectively couple the electrical power between the first and second power supplies, the first controller electrically uncoupling the first power supply from the second power supply upon determining that the second power supply reaches a prescribed charge threshold;
the first and second power supplies being selectively electrically coupled with electrical power being supplied from the second power supply to the first power supply while a first power supply level is detected by the power supply level sensing structure to be below a first prescribed power threshold, and with electrical power being supplied from the first power supply to the second power supply while a second power supply level is detected by the power supply level sensing structure to be below a second prescribed power threshold.

2. The bicycle power supply system according to claim 1, wherein
the first controller only electrically couples the first power supply to the second power supply upon determining that a current power level of the first power supply is above a prescribed power level.

3. The bicycle power supply system according to claim 1, further comprising
a second controller configured to provide a second power level signal representing the second power supply level to the first controller.

4. The bicycle power supply system according to claim 1, further comprising
a threshold setting component selectively setting at least one of the first and second prescribed power thresholds.

5. The bicycle power supply system according to claim 1, further comprising
a charging unit configured to charge at least one of the first power supply and the second power supply.

6. The bicycle power supply system according to claim 1, wherein
the power supply level sensing structure includes a first power supply sensor operatively coupled to the first power supply to detect the first power supply level of the first power supply, and a second power supply sensor operatively coupled to the second power supply to detect the second power supply level of the second power supply.

7. The bicycle power supply system according to claim 6, wherein
the first controller is further configured to selectively couple the electrical power between the first and second power supplies, the first power supply sensor and the first controller being arranged as an integrated unit.

8. The bicycle power supply system according to claim 7, further comprising
a second controller including the second power supply sensor as an integrated unit of the second controller.

9. The bicycle power supply system according to claim 8, further comprising
a third power supply, the power supply level sensing structure further including a third power supply sensor operatively coupled to the third power supply to detect a third power supply level of the third power supply.

10. The bicycle power supply system according to claim 9, further comprising a third controller including the third power supply sensor as an integrated unit of the third controller.

11. The bicycle power supply system according to claim 1, wherein
the first controller electrically uncouples the first power supply from the second power supply upon determining that the second power supply is at or above the prescribed charge threshold.

12. A bicycle power supply system comprising:
a first power supply;
a second power supply; and
a power supply level sensing structure operatively coupled to the first and second power supplies;
the first and second power supplies being selectively electrically coupled with electrical power being supplied from the second power supply to the first power supply while a first power supply level is detected by the power supply level sensing structure to be below a first prescribed power threshold, and with electrical power being supplied from the first power supply to the second power supply while a second power supply level is detected by the power supply level sensing structure to be below a second prescribed power threshold;
a first controller configured to selectively couple the electrical power between the first and second power supplies, and the first controller being configured to select two of at least three power supplies as the first and second power supplies based on respective power levels of the power supplies.

13. A bicycle power supply system comprising:
a first power supply;
a second power supply; and
a power supply level sensing structure operatively coupled to the first and second power supplies;
the first and second power supplies being selectively electrically coupled with electrical power being supplied from the second power supply to the first power supply while a first power supply level is detected by the power supply level sensing structure to be below a first prescribed power threshold, and with electrical power being supplied from the first power supply to the second power supply while a second power supply level is detected by the power supply level sensing structure to be below a second prescribed power threshold;
a first controller configured to selectively couple the electrical power between the first and second power supplies, and the first controller being further configured to select two of at least three power supplies as the first and second power supplies based on respective priority levels assigned to the power supplies.

14. The bicycle power supply system according to claim 13, further comprising
a priority setting component configured to adjust the respective priority levels assigned to the power supplies.

15. The bicycle power supply system according to claim 14, wherein
the priority setting component includes preset priority levels based on bicycle type, the preset priority levels being selectable as the respective priority levels.

16. The bicycle power supply system according to claim 14, wherein
the first controller includes the priority setting component as an integrated unit of the first controller.

17. The bicycle power supply system according to claim 14, wherein
the priority setting component is configured to include an interface port at the first controller to receive control signals from a remote device to set the respective priority levels.

\* \* \* \* \*